J. M. FEDDERS.
AIR REGULATOR FOR RADIATORS.
APPLICATION FILED JULY 5, 1919.
1,367,031.
Patented Feb. 1, 1921.
3 SHEETS—SHEET 3.
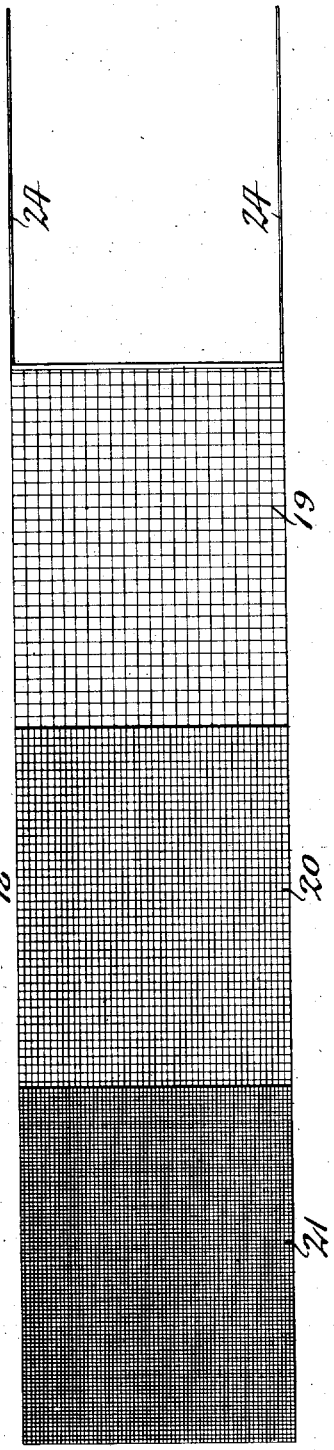
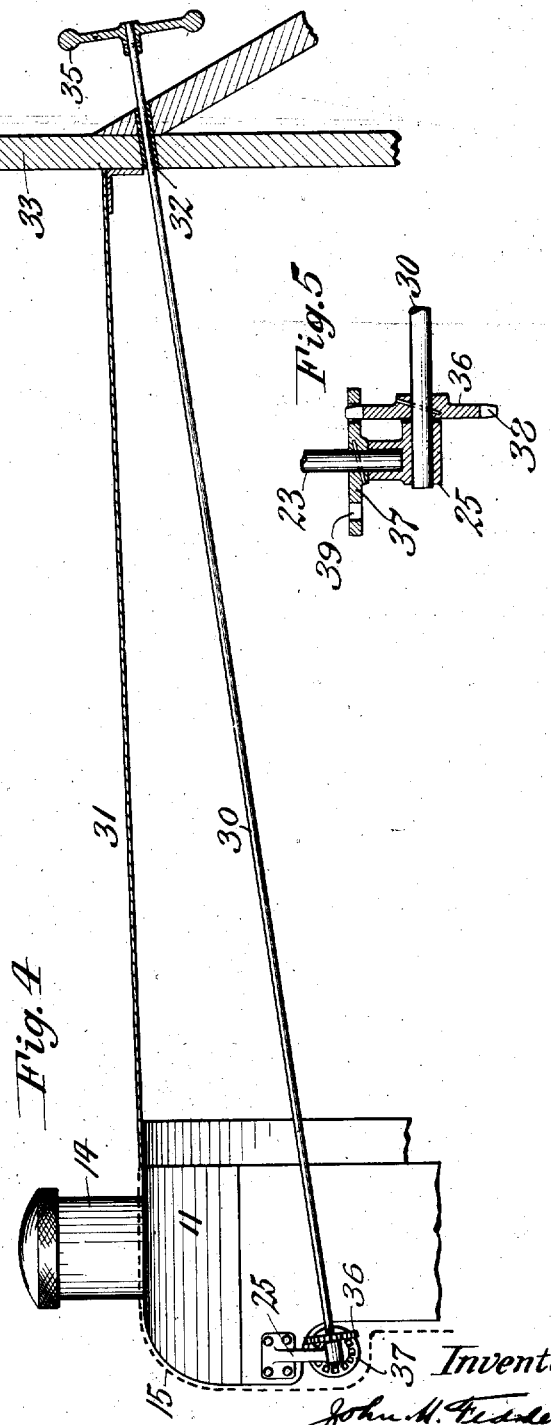
Inventor
John M. Fedders
by Meyer Popp
Attorneys

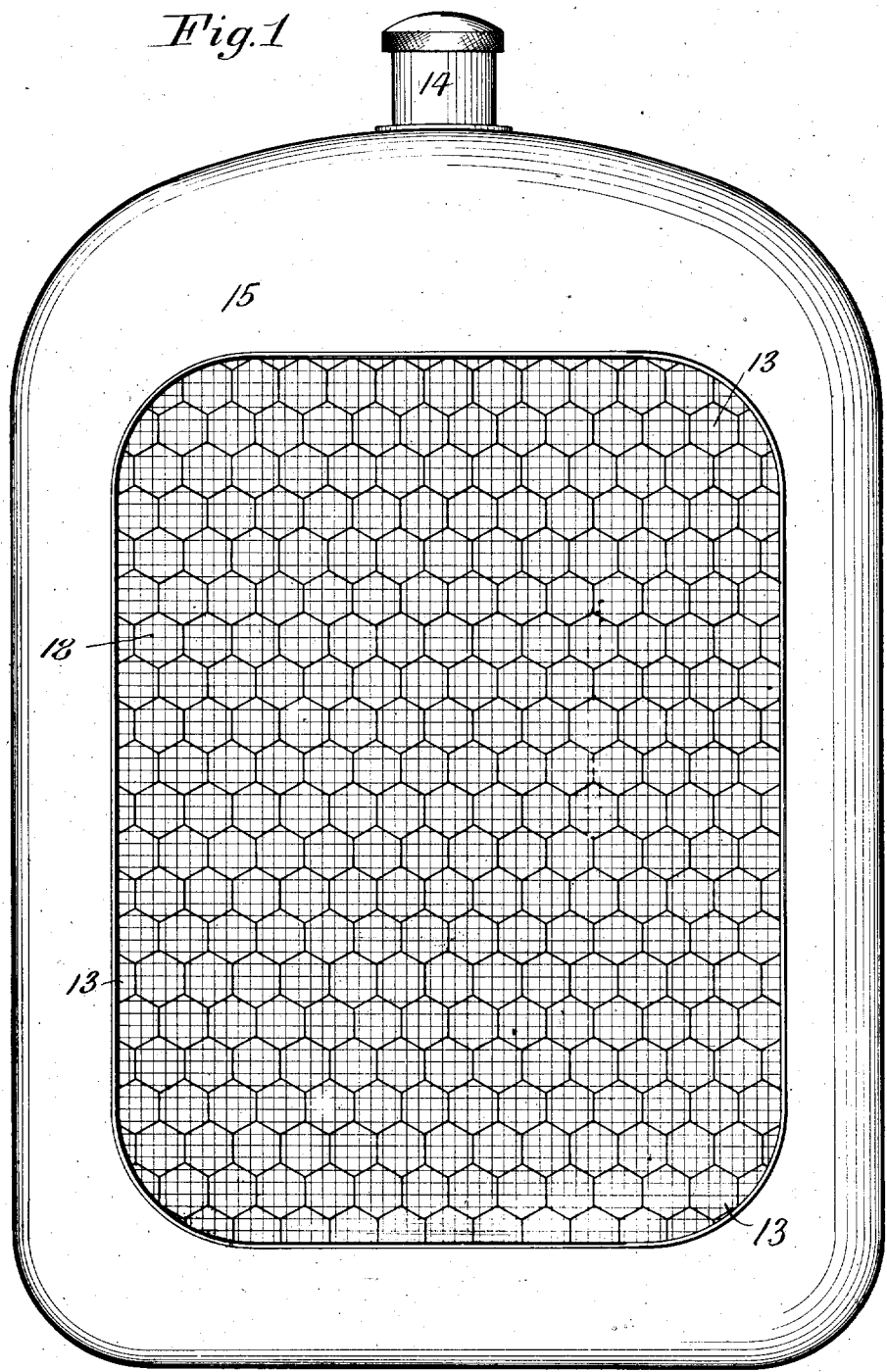

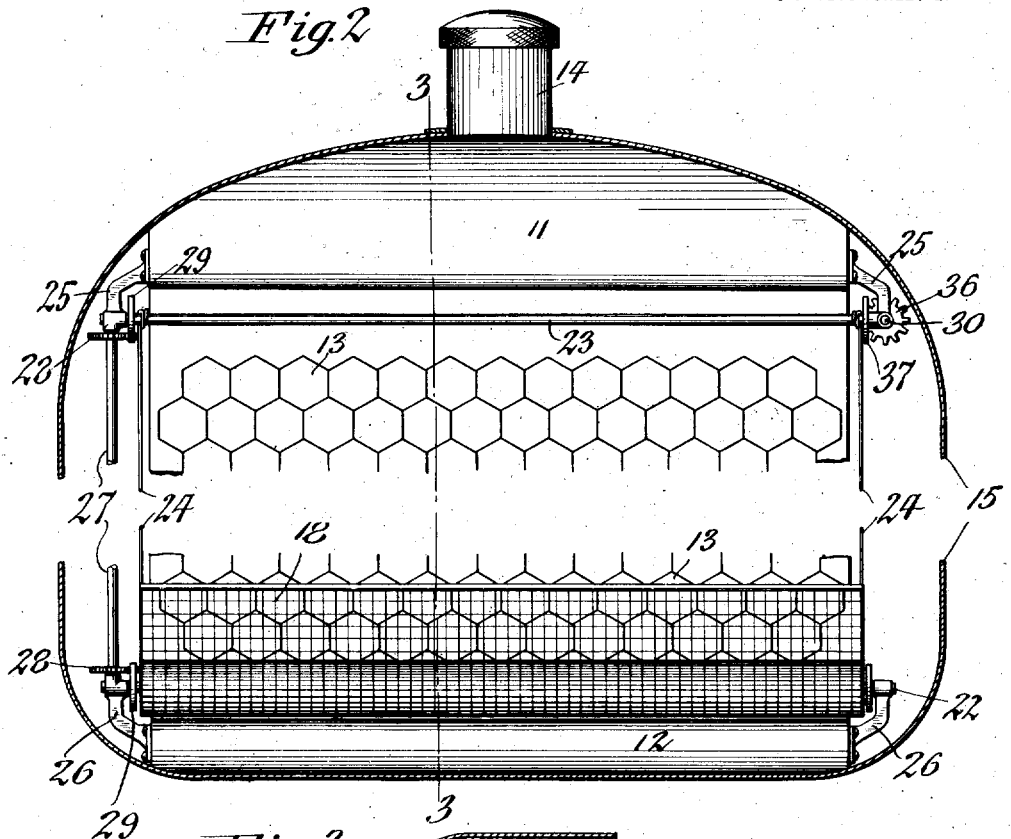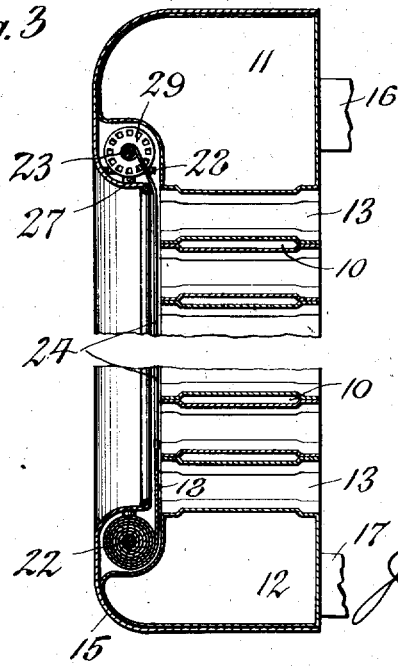

UNITED STATES PATENT OFFICE.

JOHN M. FEDDERS, OF BUFFALO, NEW YORK, ASSIGNOR TO FEDDERS MANUFACTURING COMPANY, INC., OF BUFFALO, NEW YORK, A CORPORATION OF NEW YORK.

AIR-REGULATOR FOR RADIATORS.

1,367,031.  Specification of Letters Patent.  Patented Feb. 1, 1921.

Application filed July 5, 1919. Serial No. 308,728.

*To all whom it may concern:*

Be it known that I, JOHN M. FEDDERS, a citizen of the United States, residing in Buffalo, in the county of Erie and State of New York, have invented new and useful Improvements in Air-Regulators for Radiators, of which the following is a specification.

This invention relates to a shutter for controlling the amount of air which can pass through the air passages of an automobile radiator for the purpose of regulating the cooling efficiency of the radiator in accordance with the temperature of the outer air or other conditions.

The devices heretofore used for accomplishing this purpose were so constructed that they were either complicated and unsightly and interfered with obtaining the maximum cooling efficiency when this was required, and they were also so constructed as to completely cover and render inoperative one part of the radiator while another part thereof was completely uncovered which is objectionable because in cold weather the uncovered part of the radiator through which air was permitted to pass would often freeze up while the covered part would often generate steam and thereby expose the radiator to the danger of being blown up.

It is the object of this invention to provide an air controlling or regulating device for radiators which can be applied to the radiator without detracting from its ornamental appearance while in use, which permits of varying the amount of air which passes through the several air passages so that the same is distributed uniformly among the several passages and thereby avoid freezing the water in some parts of the radiator and generating steam in others, and which is comparatively simple in construction, capable of being produced at comparatively small cost and readily applicable to the various types of automobile radiators now in general use.

In the accompanying drawings:

Figure 1 is a front elevation of an automobile radiator equipped with my invention. Fig. 2 is a fragmentary vertical transverse section of a radiator embodying my invention, similar to that shown in Fig. 1, the section being taken through the inclosing casing in front of the radiator core and the air controlling mechanism and the shutter of the latter being shifted into a position in which the same uncovers nearly all of the air tubes or passages. Fig. 3 is a fragmentary vertical longitudinal section taken on line 3—3, Fig. 2. Fig. 4 is a fragmentary vertical longitudinal section showing the means for adjusting the shutter of the air regulator or controller from the dash board of an automobile. Fig. 5 is a fragmentary horizontal section showing part of suitable means for operating the working parts of the air regulator or shutter. Fig. 6 is a plan view, on a reduced scale, of the shutter or regulating screen forming part of my invention.

In the following description, similar characters of reference refer to like parts in the several figures of the drawings.

The radiator to which my invention is applicable may be of any suitable construction and similar to those now in general use and well-known, and the one shown in the drawings may therefore be merely regarded as typical of one suitable for use in connection with my invention. As there shown, this radiator comprises a core which is constructed to form a plurality of water passages 10 extending from an upper water box or header 11 to a lower water box or header 12, and a plurality of horizontal air tubes or passages 13 extending from the front side to the rear side of the radiator, a water filler 14 arranged on top of the upper water box and an inclosing casing or shell 15 arranged around the core and water boxes, so as to give the same a finished appearance and constructed in the form of a frame which leaves the front and rear ends of the air passages or tubes exposed so that the air can enter the front ends of these tubes and leave the same at the rear ends thereof. In common with other types of radiators the water to be cooled is conducted to one of these water boxes and discharged from the other by pipes or conduits 16, 17, and in passing through the water passages which connect with these water boxes the water is cooled by the air passing through the air tubes.

The preferred embodiment of the air regulating or controlling device which contains my invention is constructed as follows:

18 represents a shutter which is preferably constructed in the form of a flexible curtain and which is adapted to be moved across the air passages or tubes of a radiator preferably across the front ends thereof. This curtain comprises a plurality of sections constructed in the form of a screen the meshes of the different sections thereof being of different sizes. By this means it is possible to permit the maximum supply of air to pass through the air tubes by moving the curtain entirely out of the air path on the front side of the radiator while upon shifting the curtain so as to bring one of its sections across the front ends of the air tubes the entrance of air to these tubes and the cooling efficiency of the same may be reduced accordingly by reason of the obstruction to the air by the screen. It is therefore possible by shifting different portions or sections of the curtain across the air path of the radiator to vary the amount of air which can pass through the radiator and exert a cooling effect upon the water, the amount of air which can thus pass through the radiator being reduced to a moderate extent when a comparatively coarse section of the curtain is arranged across the air tubes while a correspondingly greater reduction in the amount of air passing through the radiator is effected when a section of the curtain having a finer mesh is extended across the front ends of the air tubes. In its preferred form this curtain is constructed of woven wire or similar fabric so as to form three sections of different sizes of meshes, the first section 19 having a size of mesh which is comparatively coarse, the second or intermediate section 20 having its meshes of a size about half the capacity of those of the first section and the last section 21 having its meshes about half the size or capacity of those of the intermediate section. The material from which this curtain is woven consists preferably of flexible metal wire such as copper which is coated with enamel so as to increase its thickness somewhat and form an effective obstruction to the air. It is to be understood, however, that this curtain may be constructed in any other suitable manner so as to form a foraminous body for obstructing the passage of the air and that a greater or lesser number of sections having different sizes of meshes may be employed, if desired for varying the degree of obstruction to the passage of the air between one section and another.

The several sections of the regulating curtain are arranged in a longitudinal row one after another so as to form practically a continuous curtain and the same are preferably moved vertically for successively extending the same across the front ends of the air tube. In order to accomplish this in a compact manner without carrying the shutter device beyond the circumference or area of the radiator, the lower end of the curtain is secured to and adapted to be wound upon a lower winding shaft or drum 22 while the upper end of the curtain is attached to and adapted to be wound upon an upper winding shaft or drum 23, so that upon winding the curtain upon one of these shafts and unwinding the same from the other, any particular section of the curtain may be brought into its operative position across the inlet ends of the several air tubes. In order to permit of leaving the air tubes entirely unobstructed, one end of this curtain, for instance, that end thereof having the largest mesh, is connected at its opposite longitudinal edges with its respective winding shaft by means of winding lines 24 which in effect form part of the curtain and are arranged at opposite vertical edges of the core while the opposite end of the curtain, which in this case is the finest mesh section, is secured directly to the respective winding shaft. In the organization shown in the drawings, the upper and lower winding shafts are arranged horizontally and transversely across the front side of the upper and lower water boxes adjacent to the upper and lower ends of the core and journaled in bearings formed on the upper and lower brackets 25, 26 secured to opposite ends of the upper and lower water boxes, as best shown in Fig. 2. In the drawings, the winding lines and the coarse section of the curtain are arranged on the upper part thereof while the fine mesh section is arranged at the lower end thereof but it is to be understood that this relation may be varied and that the relative arrangement of the different sections of the curtain may be otherwise disposed, if desired.

Any suitable means may be provided for operating the winding shafts so that the regulating curtain may be wound either upon one of these shafts or upon the other for the purpose of bringing a particular section of the curtain across the air tubes. The means which are shown in the drawings, as an example of one suitable for this purpose, comprises an upright intermediate shaft 27 arranged adjacent to one of the vertical sides of the radiator and journaled at its opposite ends in suitable bearings on the respective upper and lower brackets 25, 26, and two pairs of intermeshing gear wheels 28, 29, connecting the opposite ends of the intermediate shaft with the adjacent ends of the upper and lower winding shafts. By means of this construction, the upper and lower winding shafts are caused to turn in unison so that as the curtain is wound upon one of the winding shafts the same unwinds in the same measure from the other winding shaft.

In order to permit of conveniently adjusting this curtain from a point adjacent to the driver's seat on the automobile and thus avoid the necessity of the driver leaving his seat for this purpose, a longitudinal adjusting shaft 30 is provided which preferably is arranged within the engine hood 31 of the automobile and journaled at its front end in a suitable bearing on one of the upper curtain brackets 25 while its rear end is journaled in a bearing 32 on the dash board 33. The rear end of this shaft is provided behind the dash board with a hand wheel 35 or other suitable contrivance for turning the same and its front end is operatively connected with that end of the upper winding shaft opposite to the gearing 28, 29, by means of a pair of intermeshing gear wheels 36, 37, secured respectively to the upper winding shaft and the adjusting shaft. By this means the driver can shift the curtain for bringing any section of the same across the air tubes without leaving the seat which is particularly desirable during inclement weather.

Although any suitable form of gearing may be employed for connecting the upright shaft with the winding shafts and the adjusting shaft with one of the winding shafts, it is preferable to employ the form of gearing which is shown in Figs. 2, 3, 4 and 5, in which case one of the gear wheels is provided with an annular row of radial teeth 38 which engage with an annular row of openings 30 in the companion gear wheel, this construction being very simple and compact and well suited for this particular work.

It will be apparent that by these means of regulating the amount of air which can pass through the core of the radiator that the cooling effect of the same can be easily and quickly adjusted to suit the requirements under different temperature conditions. Furthermore, these means permit of distributing the air uniformly over the entire radiator, so that the entire cooling surface of the same is operative at all times and all parts of the same perform a like share of the work in cooling the water regardless of whether a large or small volume of air is permitted to pass through the radiator under different temperatures, thereby avoiding irregular operation of the radiator and preventing excessive cooling or freezing of the water in one part of the radiator and excessive heating or steaming of the water in another part thereof. Moreover, this manner of controlling the supply of air to the radiator permits not only of leaving the entire radiating surface unobstructed when the maximum cooling effect is desired during hot weather, but it also preserves the ornamental appearance of the radiator over its entire front when the controlling or regulating device is in operation, by reason of the fact that the screen like curtain when extending across the front ends of the tubes is almost invisible when in use and permits of observing the latter nearly as well as if no screen were present.

I claim as my invention:

1. The combination of a radiator provided with water passages and air passages, and a screen having a plurality of sections the meshes of each section being different in size from another section, and said screen being movable for bringing each of its sections across said air passages.

2. The combination of a radiator provided with water passages and air passages, a screen having a plurality of sections the meshes of each section being different in size from another section and said screen being movable for bringing each of its sections across said air passages, and means for winding and unwinding said screen at opposite ends thereof.

3. The combination of a radiator provided with water passages and air passages, a screen having a plurality of sections the meshes of each section being different in size from another section and said screen being movable for bringing each of its sections across said air passages, and two winding shafts upon either of which said screen may be wound from opposite ends thereof.

4. The combination of a radiator provided with water passages and air passages, a screen having a plurality of sections the meshes of each section being different in size from another section and said screen being movable for bringing each of its sections across said air passages, two winding shafts with one of which one end of said screen is connected directly, and winding lines connecting the other end of said screen with the other winding shaft.

5. The combination of a radiator provided with water passages and air passages, a screen having a plurality of sections the meshes of each section being different in size from another section and said screen being movable for bringing each of its sections across said air passages, two winding shafts upon either of which said screen may be wound from opposite ends thereof, and means for causing said shafts to turn in unison.

6. The combination of a radiator provided with water passages and air passages, a screen having a plurality of sections the meshes of each section being different in size from another section and said screen being movable for bringing each of its sections across said air passages, two winding shafts upon either of which said screen may be wound from opposite ends thereof, and means for causing said shafts to turn in unison comprising an intermediate shaft, and gearing connecting said intermediate shaft with said winding shafts.

7. The combination of a radiator provided with water passages and air passages, a screen having a plurality of sections the meshes of each section being different in size from another section and said screen being movable for bringing each of its sections across said air passages, and means for operating said screen from a distance.

8. The combination of a radiator provided with water passages and air passages, a screen having a plurality of sections the meshes of each section being different in size from another section and said screen being movable for bringing each of its sections across said air passages, two winding shafts upon either of which said screen may be wound from opposite ends thereof, and means for operating said winding shafts from a distance.

9. The combination of a radiator provided with water passages and air passages, a screen having a plurality of sections the meshes of each section being different in size from another section and said screen being movable for bringing each of its sections across said air passages, two winding shafts upon either of which said screen may be wound from opposite ends thereof, an adjusting shaft, a handle connected with one end of said adjusting shaft, and gearing connecting the other end of said adjusting shaft with one of said winding shafts.

JOHN M. FEDDERS.